United States Patent
Kim (10) Patent No.: US 9,298,329 B2
(45) Date of Patent: Mar. 29, 2016

(54) DISPLAY DEVICE AND DRIVING METHOD THEREOF

(71) Applicant: LG Display Co., Ltd., Seoul (KR)

(72) Inventor: Hoon Bae Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 136 days.

(21) Appl. No.: 14/283,172

(22) Filed: May 20, 2014

(65) Prior Publication Data
US 2014/0347318 A1  Nov. 27, 2014

(30) Foreign Application Priority Data

May 22, 2013  (KR) .......................... 10-2013-0057521

(51) Int. Cl.
*G06F 3/044* (2006.01)
*G09G 3/36* (2006.01)

(52) U.S. Cl.
CPC .............. *G06F 3/044* (2013.01); *G09G 3/3648* (2013.01)

(58) Field of Classification Search
CPC ....... G06F 3/044; G06F 3/0412; G06F 3/041; G09G 3/3648
See application file for complete search history.

(56) References Cited

U.S. PATENT DOCUMENTS

| 7,859,521 | B2 | 12/2010 | Hotelling et al. | |
|---|---|---|---|---|
| 2012/0086879 | A1* | 4/2012 | Yu | G06F 3/0412 349/33 |
| 2012/0242597 | A1* | 9/2012 | Hwang | G06F 3/0412 345/173 |
| 2013/0278516 | A1* | 10/2013 | Nagata | G06F 3/041 345/173 |
| 2013/0293513 | A1* | 11/2013 | Hotelling | G02F 1/13338 345/174 |
| 2014/0049507 | A1* | 2/2014 | Shepelev | G06F 3/0412 345/174 |
| 2014/0062937 | A1* | 3/2014 | Schwartz | G06F 3/0418 345/174 |
| 2014/0092051 | A1* | 4/2014 | Weinerth | G06F 3/044 345/174 |

* cited by examiner

Primary Examiner — Latanya Bibbins
(74) Attorney, Agent, or Firm — Fenwick & West LLP

(57) ABSTRACT

The display device includes a panel comprising driving electrodes and receiving electrodes, and a touch sensing unit comprising a driver supplying a common voltage to the driving electrodes and the receiving electrodes during an image display period, and sequentially supplying a driving voltage to the driving electrodes to determine whether the panel is touched, during a touch sensing period, and a receiver determining whether there is a touch on the panel based on comparison of a sensing signal induced through the receiving electrodes by the driving voltage with a reference voltage applied to the receiving electrodes. The reference voltage is different from an intermediate level of the driving voltage corresponding to an average of a maximum level and a minimum level of the driving voltage. A root mean square value of the reference voltage is substantially equal to a root mean square value of the driving voltage.

20 Claims, 6 Drawing Sheets

DISPLAY DEVICE AND DRIVING METHOD THEREOF

CROSS-REFERENCE TO RELATED APPLICATIONS

This application claims the benefit of the Korean Patent Application No. 10-2013-0057521 filed on May 22, 2013, which is hereby incorporated by reference as if fully set forth herein.

BACKGROUND

1. Field of the Invention

The present invention relates to a display device and a driving method thereof, and more particularly, to a device and a driving method thereof including a panel with a built-in touch panel and a method of driving the same.

2. Discussion of the Related Art

With the advance of various portable electronic devices such as mobile communication terminals, smart phones, tablet computers, notebook computers, and etc., the demand for flat panel display (FPD) devices applicable to the portable electronic devices is increasing. Liquid crystal display (LCD) devices, plasma display panels (PDPs), field emission display (FED) devices, organic light emitting display devices, etc. are being actively researched as the FPD devices.

A touch panel is a type of input device that is included in display devices such as liquid crystal display (LCD) devices, plasma display panels (PDPs), organic light emitting display device (OLED), and electrophoretic displays (EPDs), and enables a user to input information by directly touching a screen with a finger, a pen or the like while looking at the screen of the display device.

Particularly, the demand of display devices with in-cell type touch panel, which include a plurality of built-in elements configuring the touch panel for slim portable terminals such as smart phones and tablet Personal Computers (PCs), is recently increasing.

In an in-cell type display device, as disclosed in U.S. Pat. No. 7,859,521, a plurality of common electrodes for display are segmented into a plurality of touch driving areas and touch sensing areas. An in-cell type display device allows a mutual capacitance to be generated between the touch driving area and the touch sensing area. Thus, the in-cell type display device measures the change in a mutual capacitance that occurs in touch to determine whether there is a touch.

In other words, in the related art in-cell type display device, a plurality of common electrodes for displaying an image perform the function of a touch electrode when a panel operates in a touch sensing mode, for simultaneously performing a display function and a touch function.

As described above, in a related art in-cell type mutual capacitive display device using the common electrode, the common electrode is used as a driving electrode or a receiving electrode that is used for touch sensing. An image display period and a touch sensing period are separated. Thus, noise generated in the image display period does not affect touch sensing.

In the image display period, a driving electrode and a receiving electrode act as common electrodes. In the touch sensing period, a periodic driving pulse is applied to the driving electrode, and a touch IC determines whether there is a touch by using a sensing signal that is received through the receiving electrode.

Figure 1:
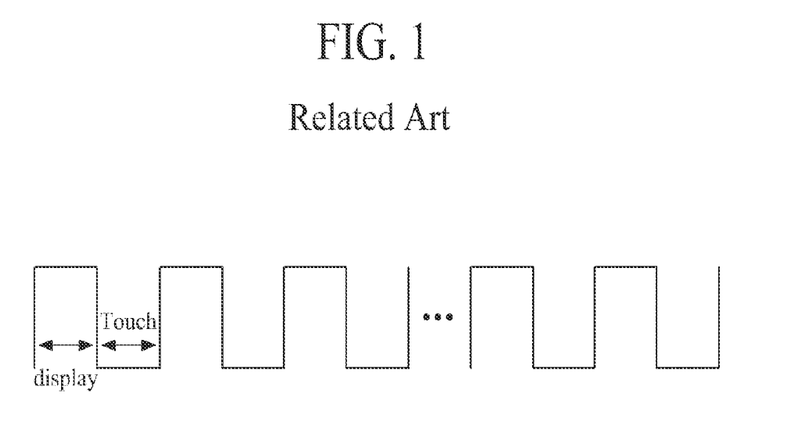
FIG. 1 is a waveform diagram showing an image display period and a touch sensing period in a related art in-cell type display device.
Figure 2:
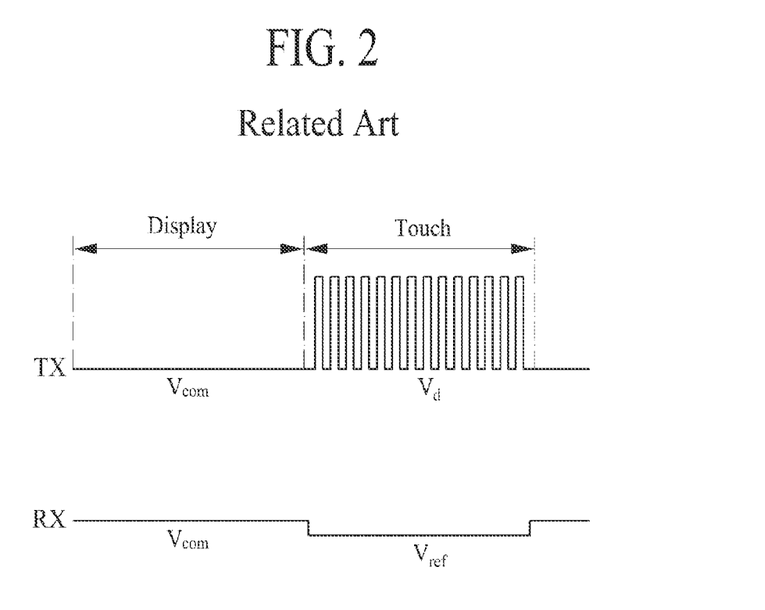
FIG. 2 is an exemplary diagram showing waveforms of a voltage outputted to a driving electrode and a receiving electrode in a related art in-cell type display device.

FIG. 1 is a waveform diagram showing an image display period and a touch sensing period in a related art in-cell type display device, and FIG. 2 is an exemplary diagram showing waveforms of a voltage outputted to a driving electrode and a receiving electrode in a related art in-cell type display device.

A touch panel applied to an in-cell type display device includes a touch electrode to which common voltage is supplied during the image display period and driving voltage is supplied during touch sensing period, and a receiving electrode to which common voltage is supplied during the image display period and reference voltage is supplied during the touch sensing period.

In a related art in-cell touch type display device, as shown in FIG. 1, an image display period (Display) and a touch sensing period (Touch) are separated from each other.

During an image display period, as shown in FIG. 2, a common voltage Vcom is supplied to the driving electrode TX and the receiving electrode RX. During a touch sensing period, a driving voltage Vd having a pulse type is supplied to the driving electrode TX, and a reference voltage Vref is supplied to the receiving electrode RX.

In this case, block dim is caused in a panel of the in-cell type display device due to a difference between root mean square values Vrms of voltages respectively supplied to the driving electrode TX and the receiving electrode RX during the touch sensing period.

That is, as shown in FIG. 2, in the image display period, common voltages Vcom having the same level are supplied to the driving electrode TX and the receiving electrode RX, and thus, an equal voltage is generated for the driving electrode TX and the receiving electrode RX, whereby an image-quality defect such as block dim due to a luminance difference between the electrodes is not caused.

However, in a touch sensing period (Touch), because the driving voltage Vd supplied to the driving electrode TX swings between the common voltage Vcom and a voltage greater than the common voltage Vcom, the root mean square value of the driving voltage Vd is greater than the reference voltage Vref (or the common voltage Vcom) supplied to the receiving electrode RX. Therefore, block dim is caused due to a luminance difference between the driving electrode TX and the receiving electrode RX.

SUMMARY

Accordingly, the present invention is directed to provide a display device and a method of driving the same, which substantially obviate one or more problems due to limitations and disadvantages of the related art.

An aspect of the present invention is directed to provide a display device and a method of driving the same, which match root mean square value of a reference voltage (supplied to a receiving electrode) and root mean square value of a driving voltage, by adjusting pulse widths of pulses configuring the driving voltage supplied to a driving electrode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a panel comprising a plurality of driving electrodes and a plurality of receiving electrodes; and a touch sensing unit including a driver supplying a common voltage to the driving electrodes and the receiving electrodes during an image display period, and sequentially supplying a driving voltage to the driving electrodes to determine whether the panel is touched, during a touch sensing period, and a receiver determining whether there is a touch on the panel based on comparison of a sensing signal induced through the receiving electrodes by the driving voltage with a reference voltage applied to the receiving electrodes, the reference voltage being different from an intermediate level of the driving voltage corresponding to an average of a maximum level and a minimum level of the driving voltage, wherein a root mean square value of the reference voltage is substantially equal to a root mean square value of the driving voltage.

In another aspect of the present invention, there is provided a method of driving a display device including: supplying a common voltage to driving electrodes and receiving electrodes, which are formed in a panel, during an image display period; sequentially supplying a driving voltage to the driving electrodes during a touch sensing period; comparing a sensing signal induced through the receiving electrodes by the driving voltage with a reference voltage applied to the receiving electrodes, the reference voltage being different from an intermediate level of the driving voltage corresponding to an average of a maximum level and a minimum level of the driving voltage; and determining whether there is a touch on the panel based on the comparison of the sensing signal with the reference voltage, wherein a root mean square value of the reference voltage is substantially equal to a root mean square value of the driving voltage.

In another aspect of the present invention, there is provided a display device including: a panel comprising a plurality of driving electrodes and a plurality of receiving electrodes; and a touch sensing unit comprising: a driver supplying a common voltage to the driving electrodes and the receiving electrodes during an image display period, and sequentially supplying a driving voltage to the driving electrodes to determine whether the panel is touched, during a touch sensing period, the driving voltage comprising a plurality of pulses including first pulses and second pulses, each of the first pulses having a first pulse width and each of the second pulses having a second pulse width, the first pulses alternating with the second pulses and the first pulse width being different than the second pulse width, and a receiver determining whether there is a touch on the panel based on comparison of a sensing induced through the receiving electrodes by the driving voltage with a reference voltage applied to the receiving electrodes, the reference voltage being different from an intermediate level of the driving voltage corresponding to an average of a maximum level and a minimum level of the driving voltage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In the following description, for convenience of description, an LCD device will be described as an example of the present invention, but the present invention is not limited thereto. That is, the present invention may be applied to various display devices that display an image by using a common electrode and a common voltage.

Figure 3:
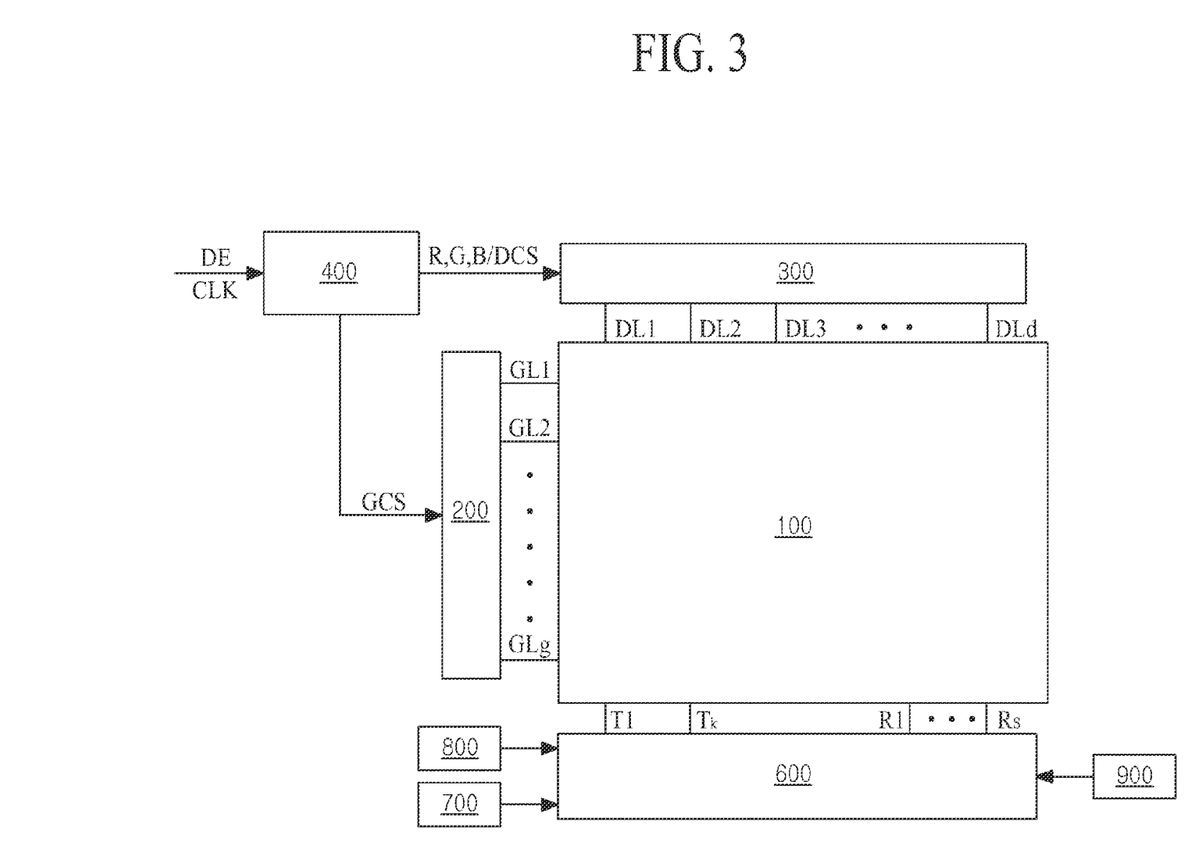
FIG. 3 is an exemplary diagram schematically illustrating a configuration of a display device according to an embodiment of the present invention.
Figure 4:
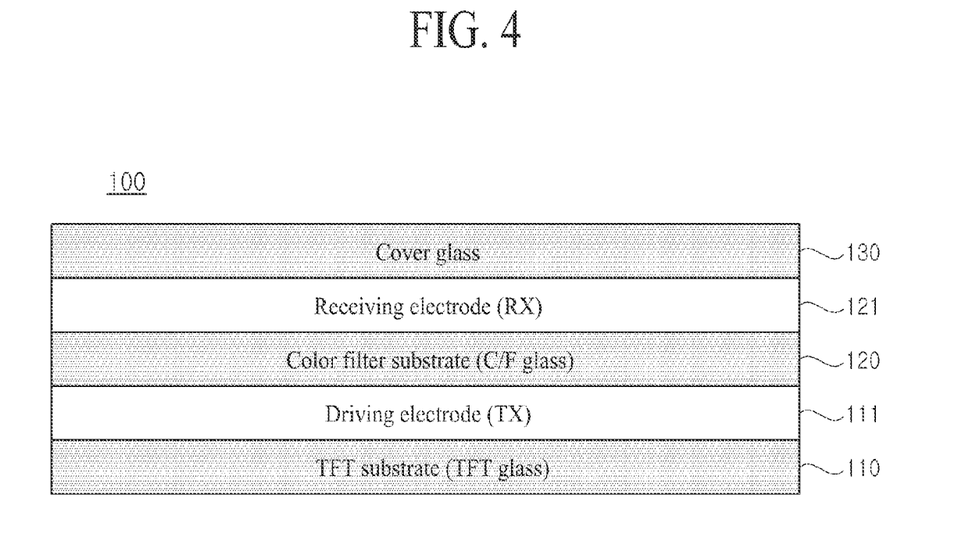
FIG. 4 is an exemplary diagram schematically illustrating a sectional view of a panel of a display device according to an embodiment of the present invention.
Figure 5:
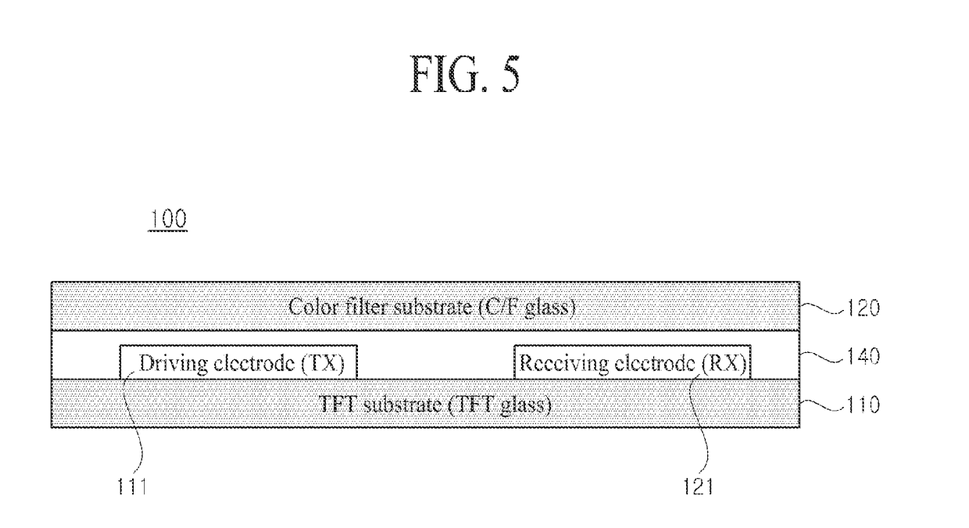
FIG. 5 is another exemplary diagram schematically illustrating a sectional view of a panel of a display device according to an embodiment of the present invention.
Figure 6:
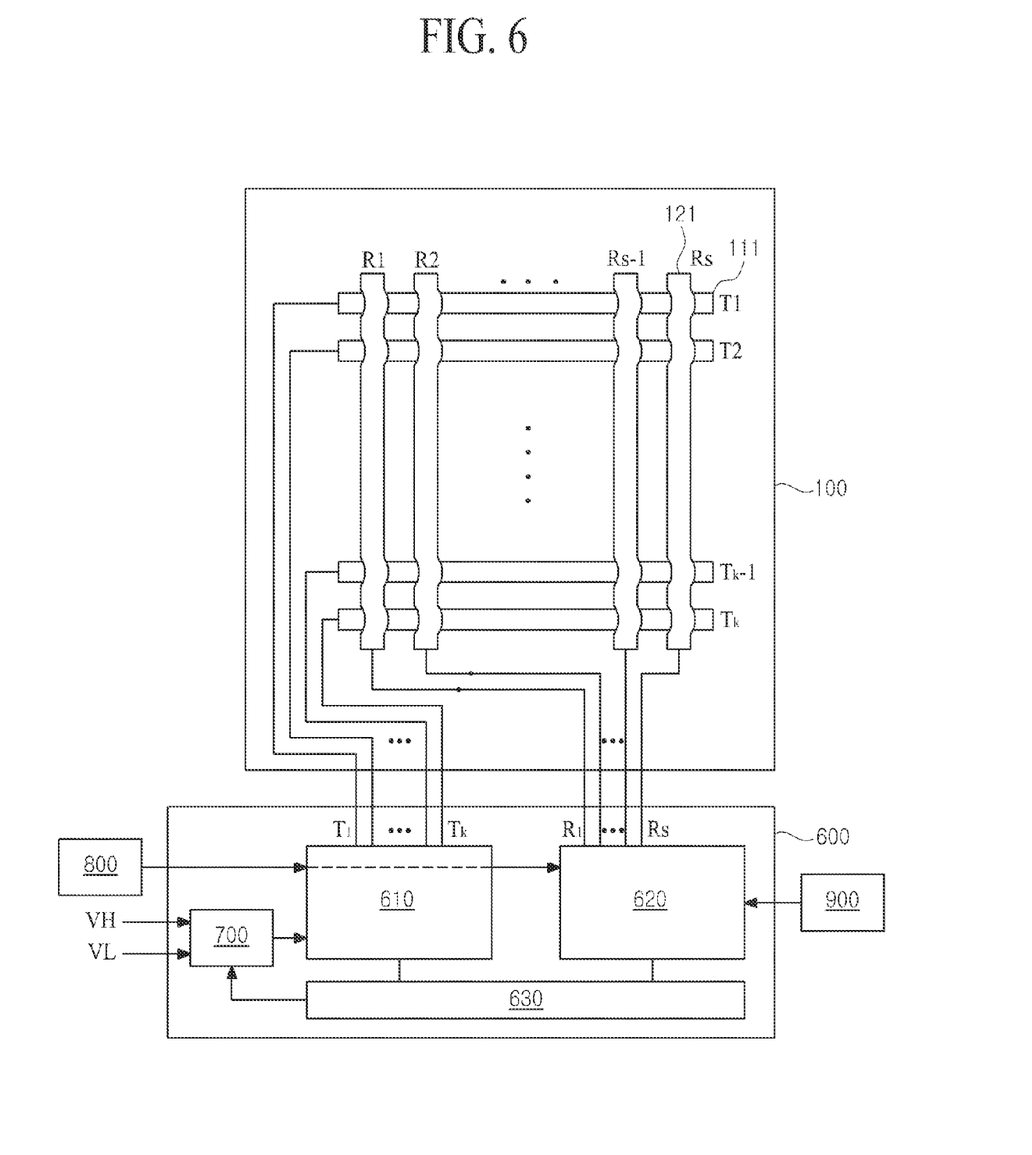
FIG. 6 is an exemplary diagram schematically illustrating a configuration of a panel and a touch sensing unit applied to a display device according to an embodiment of the present invention.

FIG. 3 is an exemplary diagram schematically illustrating a configuration of a display device according to an embodiment of the present invention, FIG. 4 is an exemplary diagram schematically illustrating a sectional view of a panel of a display device according to an embodiment of the present invention, FIG. 5 is another exemplary diagram schematically illustrating a sectional view of a panel of a display device according to an embodiment of the present invention, and FIG. 6 is an exemplary diagram schematically illustrating a configuration of a panel and a touch sensing unit applied to a display device according to an embodiment of the present invention.

The display device according to the present invention, as illustrated in FIGS. 3 and 6, includes: a panel 100 comprising a plurality of driving electrodes 111 and a plurality of receiving electrodes 121; a common voltage supply 800 generating a common voltage Vcom; a driving voltage supply 700 generating a driving voltage Vd; a touch sensing unit 600 supplying the common voltage Vcom to the driving electrodes 111 and the receiving electrodes 121 during an image display period, and sequentially supplying the driving voltage Vd to the driving electrodes 111 to determine whether there is a touch on the panel 100 during a touch sensing period; a reference voltage supply 900 formed in the touch sensing unit 600, and applying a reference voltage Vref, the level of which is different from an intermediate level of the driving voltage Vd, to a receiver 620 connected to the receiving electrodes 121 during the touch sensing period; a gate driver 200 sequentially supplying a gate pulse to gate line lines GL1 to GLg formed in the panel 100; a data driver 300 supplying a data voltage to data lines DL1 to DLd formed in the panel 100; and a timing controller 400 controlling functions of the gate driver 200, the data driver 300 and the touch sensing unit 600.

In FIG. 4, the panel 100 may include a color filter substrate 120, a thin film transistor (TFT) substrate 110 in which the gate lines GL1 to GLg and the data lines DL1 to DLd are formed, and liquid crystal injected between the color filter substrate 120 and the TFT substrate 110.

A touch panel configured with the driving electrodes 111 and the receiving electrodes 121 is built into the panel 100.

The touch panel applied to the present invention uses a capacitive type, and is especially built into the panel 100. The touch panel built into the panel 100 may be formed in a hybrid in-cell type or an in-cell type.

The hybrid in-cell type touch panel may include a plurality of driving electrodes T1 to Tk 111, which are formed on the TFT substrate 110 or the color filter substrate 120 and are parallel to a plurality of the gate lines formed on the TFT substrate 110, and receiving electrodes R1 to Rs 121, which are formed on an upper end surface of the color filter substrate 120 with an insulation layer between the driving electrodes 111 and the receiving electrodes 121. However, the receiving electrodes 121 may be formed on the TFT substrate 110 or the color filter substrate 120, and the driving electrodes 111 may be formed on an upper end surface of the color filter substrate 120. For example, at least one of a first group configured with the driving electrodes T1 to Tk 111 and a second group configured with the receiving electrodes R1 to Rs 121 may be disposed on the TFT substrate 110 or the color filter substrate 120, and the other may be disposed in an upper surface of the color filter substrate 120. In the touch panel illustrated in FIG. 4, the driving electrodes 111 corresponding to the first group are formed on the TFT substrate 110, the receiving electrodes 121 corresponding to the second group are formed on an upper end surface of the color filter substrate 120, and the receiving electrodes 121 is covered by a cover glass 130.

The in-cell type touch panel, as illustrated in FIG. 5, includes driving electrodes 111 and receiving electrodes 121, which are formed on the TFT substrate 110. For example, all of the driving electrodes 111 and the receiving electrodes 121 are formed on the TFT substrate 110. Especially, the driving electrodes 111 and the receiving electrodes 121 may be formed on the same layer. In this case, the driving electrode 111 or the receiving electrode 121 is formed on another layer through a contact hole, in an intersection area of the driving electrode 111 and the receiving electrode 121, and thus, the driving electrode 111 and the receiving electrode 121 do not substantially contact with each other. Therefore, the driving electrodes 111 and the receiving electrodes 121 may be formed on the TFT substrate 110 by using various methods satisfying the above-described configuration.

Hereinafter, each of the hybrid in-cell type touch panel and the in-cell type touch panel is referred to as a touch panel.

Referring back to FIG. 3, the timing controller 400 receives a timing signal, such as the data enable signal, the dot clock, or the like, from an external system to generate the control signals GCS and DCS for controlling an operation timing of the data driver 300 and the gate driver 200. Moreover, the timing controller 400 aligns input video data transferred from the external system to supply aligned video data to the data driver 300.

Moreover, in addition to controlling the data driver 300 and the gate driver 200, the timing controller 400 may generate control signals for controlling an input/output operation timing of the touch sensing unit 600 to control the touch sensing unit 600.

Next, the data driver 300 converts the video data received from the timing controller 400 into analog data voltages, and respectively supplies the data voltages for one horizontal line to the data lines DL1 to DLd at every one horizontal period where a gate pulse is supplied to one of the gate lines GL1 to GLg. That is, the data driver 300 converts the video data into the data voltages by using gamma voltages supplied from a gamma voltage generator (not shown), and respectively outputs the data voltages to the data lines.

That is, the data driver 300 shifts a source start pulse supplied from the timing controller 400 according to a source shift clock to generate a sampling signal. Furthermore, the data driver 300 latches the video data RGB, which are inputted according to the source shift clock, according to the sampling signal to convert the video data into the data voltage, and then, supplies the data voltage to the data lines DL1 to DLd in units of a horizontal line in response to a source output enable signal.

To this end, the data driver 300 may include a shift register (not shown), a latch unit (not shown), a digital-to-analog converter DAC (not shown), and an output buffer (not shown), or the like.

The shift register generates a sampling signal by using data control signals received from the timing controller 400.

The latch unit latches the digital video data (RGB) sequentially received from the timing controller 400, and then, simultaneously outputs the latched video data to the DAC.

The DAC simultaneously converts the video data, transferred from the latch, into positive or negative data voltages, and outputs the positive or negative data voltages. Specifically, the DAC converts the image data into the positive or negative data voltages by using a gamma voltage supplied from a gamma voltage generator (not shown) according to a polarity control signal POL transferred from the timing controller 400, and outputs the positive or negative data voltages to the respective data lines DL.

The output buffer outputs the positive or negative data voltages, transferred from the DAC, to the respective data lines DL of the panel 100 according to a source output enable signal transferred from the timing controller 400.

The gate driver 200 shifts a gate start pulse transferred from the timing controller 400 to sequentially supply a gate pulse having a gate-on voltage Von to the gate lines GL1 to GLg according to a gate shift clock. Furthermore, the gate driver 200 supplies a gate-off voltage Voff to the gate lines GL1 to GLg during a period where the gate pulse having the gate-on voltage Von is not supplied to the gate lines GL1 to GLg.

Here, the gate driver 200 applied to the present invention may be manufactured independently from the panel 100 and electrically connected to the panel 100 in various types, but the present invention is not limited thereto. As another example, the gate driver 200 may be provided in the Gate In Panel (GIP) type where the gate driver 200 is implemented in the panel 100. In this case, the gate control signals for controlling the gate driver 200 may be a start signal and a gate clock.

Hereinabove, the data driver 300, the gate driver 200 and the timing controller 400 configured individually are described. However, the timing controller 400 and at least one of the data driver 300 and the gate driver 200 may be integrated as one body.

The common voltage supply 800 generates the common voltage Vcom supplied to the driving electrodes 111 and the receiving electrodes 121, so as to display an image. The common voltage Vcom generated from the common voltage supply 800 is supplied to the driving electrodes 111 and the receiving electrodes 121 through the touch sensing unit 600.

The driving voltage supply 700 generates the driving voltage Vd supplied to the driving electrodes 111, so as to detect a touch. The driving voltage Vd generated from the driving voltage supply 700 is supplied to the driving electrodes 111 through the touch sensing unit 600.

The driving voltage supply 700 may generate the driving voltage Vd having a pulse type by using the maximum voltage VH and the minimum voltage VL supplied from a power supply not shown. An intermediate level of the driving voltage Vd herein refers to an average of a maximum voltage VH and the minimum voltage VL.

That is, the driving voltage Vd having a pulse type is supplied to the driving electrode 111. Each of pulses configuring the driving voltage Vd has one of at least two or more pulse widths. For example, some of the pulse may have a first pulse width, and the others may have a second pulse width.

The driving voltage supply 700, as illustrated in FIG. 3, may be configured independently from the touch sensing unit 600, or as illustrated in FIG. 6, the driving voltage supply 700 may be provided in the touch sensing unit 600.

As illustrated in FIG. 6, the touch sensing unit 600, as described above, detects a user's touch by using the sensing signals (voltage values) received from the receiving electrodes R1 to Rs 121. That is, with a driving voltage Vd for detecting a touch being sequentially applied to the driving electrodes T1 to Tk 111, when the user touches a specific area of the panel 100 with a finger or a pen, the capacitances between the driving electrodes T1 to Tk 111 and the receiving electrodes R1 to Rs 121 are changed, and the capacitance changes affect the changes in voltage values (sensing signals) applied to the touch sensing unit 600 through the receiving electrodes R1 to Rs 121.

The receiving electrodes R1 to Rs 121 are connected to the touch sensing unit 600, and the touch sensing unit 600 determines whether there is a touch on the panel 100 by using the changed voltage values (changed sensing signals).

For this end, the touch sensing unit 600, as illustrated in FIG. 6, includes a driver 610 connecting the common voltage supply 800 to the driving electrodes 111 during the image display period and sequentially connecting the driving voltage supply 700 to the driving electrodes 111 during the touch sensing period; a receiver 620 connecting the common voltage supply 800 to the receiving electrodes 121 during the image display period and determining whether there is a touch by using the reference voltage supplied from the reference voltage supply 900 and the sensing signals transferred from the receiving electrodes 121 during the touch sensing period; and a controller 630 controlling functions of the driver 610 and the receiver 620.

The touch sensing unit 600 may be configured as an integrated circuit (IC). In this case, the touch sensing unit 600 may include the driving voltage supply 700 and the reference voltage supply 900.

The reference voltage supply 900 supplies the reference voltage Vref to the receiver 620.

The receiver 620 determines whether there is a touch on the panel 100 by using the sensing signal received from the receiving electrode 121.

The reference voltage Vref is supplied to the receiver 620, but because the receiver 620 is connected to the receiving electrodes 121, a voltage corresponding to the reference voltage Vref is applied to the receiving electrodes 121 by the reference voltage Vref supplied to the receiver 620 during the touch sensing period.

Figure 7:
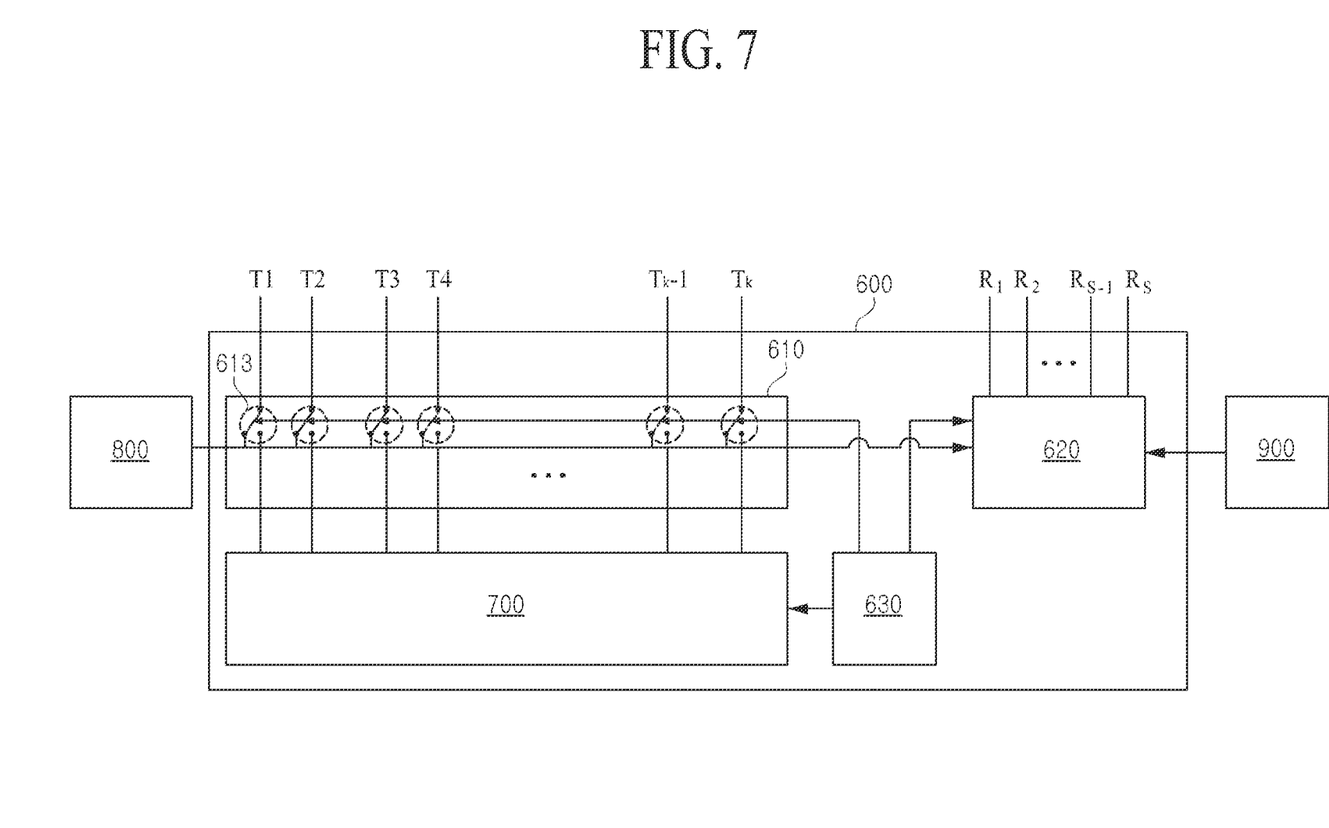
FIG. 7 is an exemplary diagram illustrating a configuration of a touch sensing unit applied to the display device according to the present invention.

The reference voltage supply 900, as illustrated in FIGS. 3, 6 and 7, may be configured independently from the touch sensing unit 600, but may be formed in the touch sensing unit 600.

Figure 8:
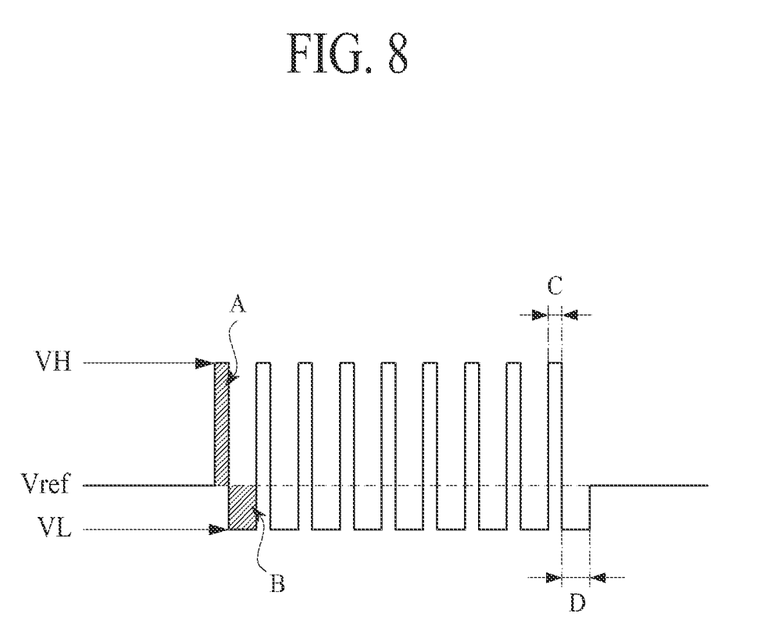
FIG. 8 is an exemplary diagram showing waveforms of a driving voltage applied to the display device according to the present invention.

FIG. 7 is an exemplary diagram illustrating a configuration of a touch sensing unit 600 applied to the display device according to the present invention, and FIG. 8 is an exemplary diagram showing waveforms of a driving voltage Vd applied to the display device according to the present invention.

The touch sensing unit 600, as described above, includes the driver 610, the receiver 620 and the controller 630.

Moreover, the driving voltage supply 700 may be included in the touch sensing unit 600. That is, as described above, the driving voltage supply 700 may be configured independently from the touch sensing unit 600, but the driving voltage supply 700 may be formed in the touch sensing unit 600. Therefore, hereinafter, the driving voltage supply 700 and the touch sensing unit 600 integrated as one body will be described as an example of the present invention. Also, the reference voltage supply 900 may be formed in the touch sensing unit 600.

The driver 610 connects the common voltage supply 800 to the driving electrodes 111 during the image display period, and sequentially connects the driving voltage supply 700 to the driving electrodes 111 during the touch sensing period.

For this end, the driver 610 may include a plurality of driver switches 613 which connect each of the driving electrodes T1 to Tk 111 to the common voltage supply 800 or the driving voltage supply 700.

Each of the driver switches 613 connects each of the driving electrodes 111 to the common voltage supply 800 or the driving voltage supply 700 according to a sync signal transferred from the controller 630.

For example, the controller 630 simultaneously transfers first sync signals to the driver switches 613 during the image display period. Therefore, the driver switches 613 simultaneously connect the common voltage supply 800 to the driving electrodes 111.

However, the controller 630 sequentially transfers a second sync signal to the driver switches 613 during the touch sensing period. Therefore, the driver switches 613 which have been connecting the common voltage supply 800 to the driving electrodes 111 sequentially connect the driving voltage supply 700 to the driving electrodes 111 according to the second sync signal. In this case, the receiver 620 compares the reference voltage Vref and the sensing signal, which is transferred from each of the receiving electrodes 121 by the driving electrodes 111 sequentially connected to the driving voltage supply 700, to determine whether the panel 100 is touched.

The receiver 620 connects the common voltage supply 800 to the receiving electrodes 121 during the image display period, and determines whether there is a touch on the panel 100 during the touch sensing period by using the reference voltage Vref supplied from the reference voltage supply 900 and the sensing signal received from the receiving electrodes 121.

For this end, the receiver 620 is connected to the common voltage supply 800 and the reference voltage supply 900, and detects a touch according to a control signal transferred from the controller 630.

The receiver 620 may include a receiver switch (not shown) which disconnects the common voltage supply 800 from the receiving electrodes 121. In this case, the receiver switch connects the receiving electrodes 121 to the common voltage supply 800 according to the first sync signal during the image display period, and disconnects the receiving electrodes 121 from the common voltage supply 800 according to a third sync signal, which is transferred from the controller 630, during the touch sensing period.

The reference voltage supply 900 may be continuously connected to the receiver 620 during the image display period and the touch sensing period, but may be connected to the receiver 620 only during the touch sensing period. For this end, a reference voltage switch (not shown), connecting the reference voltage supply 900 and the receiver 620, may be formed in the receiver 620 or the touch sensing unit 600. In this case, the reference voltage switch turns on according to a fourth sync signal supplied from the controller 630 during the touch sensing period to connect the reference voltage supply 900 to the receiver 620.

The reference voltage Vref may be the same as the common voltage Vcom, or may be greater than the common voltage Vcom, or may be less than the common voltage Vcom.

The controller 630, as described above, may transfer the first sync signal to the driver switches 613 and the receiver switches (not shown) during the image display period, and may transfer the second sync signal to the driver switches 613 and the thirds signal to the receiver switches during the touch sensing period.

The driving voltage supply 700, as described above, generates the driving voltage Vd having a pulse type and supplies the driving voltage Vd to the driver 610.

The driving voltage Vd, as illustrated in FIG. 8, is generated as the type of a pulse which swings between the maximum voltage VH and the minimum voltage VL, and is supplied to the driver 610.

The driving voltage supply 700 generates the pulse type driving voltage Vd which swings between the maximum voltage VH and the minimum voltage VL, by using the maximum voltage VH and the minimum voltage VL supplied from a power supply (not shown). The pulses in the driving voltage Vd may swing with respect to the reference voltage Vref.

Each of pulses configuring the driving voltage Vd may have one of at least two or more pulse widths.

For example, as illustrated FIG. 8, each of first group pulses among the pulses may have a first pulse width (C), and each of the other second group pulse may have a second pulse width (D). Here, each of the first group pulses has a voltage greater than the reference voltage Vref, and each of the second group pulses has a voltage less than the reference voltage Vref.

In this case, the first pulse width (C) and the second pulse width (D) are set so that the root mean square value of each of the pulses is the same as that of the reference voltage Vref.

Here, the root mean square value of each of the pulses being the same as that of the reference voltage Vref denotes that the area (A) of the pulses having the first pulse width (C) is the same as the area (B) of the pulses having the second pulse width (D).

Therefore, if the root mean square value of the pulses is the same as that of the reference voltage Vref, each of the pulses may have one of three or more different pulse widths.

That is, if the sum of the areas (A) of the first group pulses, each of which has a voltage greater than the reference voltage Vref, is the same as the sum of the areas (B) of the second group pulses, each of which has a voltage less than the reference voltage Vref, each of the pulses may have one of three different pulse widths or may have one of four different pulse widths.

The minimum value of the pulses configuring the driving voltage Vd, namely, the minimum voltage VL may have a positive polarity.

In one embodiment, the driving voltage Vd swings with respect to the reference voltage Vref, and the minimum voltage VL of the driving voltage Vd has a positive polarity.

The reason that the minimum voltage VL of the driving voltage Vd has a positive polarity is for matching the root mean square value of the driving voltage Vd and the root mean square value of the reference voltage Vref by swinging the driving voltage Vd with respect to the reference voltage Vref, even in the display device which does not use a negative voltage.

Alternatively, the minimum voltage VL of the driving voltage Vd may have a negative polarity. Hence, the present invention may be applied to a display device using a negative voltage.

Here, the reference voltage Vref may be less than an intermediate level of the driving voltage Vd. That is, the reference voltage Vref may be less than an intermediate level between the maximum voltage VH and the minimum voltage VL of the driving voltage Vd.

In this case, the reference voltage Vref is less than the intermediate level of the driving voltage, but a pulse width (C) of each of the first group pulses, which has a level equal to or greater than the reference voltage Vref, is less than a pulse width (D) of each of the second group pulses, which has a level equal to or less than the reference voltage Vref, and thus, the root mean square value of the pulses may match the reference voltage Vref.

However, the reference voltage Vref may be greater than an intermediate level of the driving voltage Vd. That is, the reference voltage Vref may be greater than an intermediate level between the maximum voltage VH and the minimum voltage VL of the driving voltage Vd.

In this case, the reference voltage Vref is greater than the intermediate level of the driving voltage Vd, but a pulse width (C) of each of the first group pulses, which has a level equal to or greater than the reference voltage Vref, is greater than a pulse width (D) of each of the second group pulses, which has a level equal to or less than the reference voltage Vref, and thus, the root mean square value of the pulses may match the reference voltage Vref.

That is, in order for the root mean square value of the pulse type driving voltage Vd to match the root mean square value of the reference voltage Vref, the area of the first group pulses, each of which has a level greater than the reference voltage Vref should match the area of the second group pulses, each of which has a level less than the reference voltage Vref.

Therefore, in order for the area of the first group pulses to match the area of the second group pulses, the reference voltage, the pulse width (C) of each of the first group pulses and the pulse width (D) of each of the second group pulses may be variously set.

In another example, the pulses in the driving voltage Vd may swing with respect to a rest voltage level (not shown) different from the reference voltage Vref, and the driving voltage Vd is maintained in the rest voltage level between the pulses. Therefore, the driving voltage Vd includes pulses having voltage levels greater than the rest voltage level, pulses having voltage levels less than the rest voltage level, and a voltage at the rest voltage level. In this case, the pulse widths are adjusted such that a root mean square value of an area above the reference voltage Vref of the driving voltage Vd and a root mean square value of an area below the reference voltage Vref of the driving voltage Vd are substantially equal, regardless of the value of the rest voltage level. Hence, the root means square value of the driving voltage Vd is substantially equal to the reference voltage Vref.

Hereinafter, the method of driving a display device according to the present invention will be simply described.

First, the touch sensing unit 600 supplies the common voltage Vcom to the driving electrodes 111 and the receiving electrodes 121, which are formed in the panel 100, during the image display period.

For this end, the controller 630 of the touch sensing unit 600 transfers the first sync signal to the driver switches 613 and the receiver switches.

Next, the controller 630 supplies the driving voltage Vd to the driving electrodes 111 formed in the panel 100 during the touch sensing period. In this case, the reference voltage Vref is applied to the receiving electrodes 111.

For this end, the controller 630 of the touch sensing unit 600 sequentially transfers the second sync signal to the driver switches 613, and simultaneously transfers the third sync signal to the receiver switches. Furthermore, the controller 630 connects the reference voltage supply 900 to the receiver 620. For this end, the fourth sync signal may be transferred to the reference voltage switch.

Here, the level of the reference voltage Vref is different from the intermediate level of the driving voltage Vd, and each of the pulses configuring the driving voltage Vd may have one of at least two or more pulse widths.

Moreover, the root mean square value of the pulses is the same as the reference voltage Vref, and the minimum value of the pulses has a positive polarity.

Finally, the receiver 620 determines whether there is a touch on the panel 100 by using a reference voltage Vref supplied from the reference voltage supply 900 and the sensing signal induced through the receiving electrodes 121 by the driving voltage Vd.

As described above, in order to reduce block dim caused by a voltage deviation between the driving electrodes 111 and the receiving electrodes 121 in the display devices, the present invention optimized the root mean square value of the driving voltage Vd by adjusting the pulse widths of the pulses configuring the driving voltage Vd. The above-described present invention will be summarized simply.

First, in a touch panel where a common electrode, receiving a common voltage Vcom is supplied, is used as a touch electrode, the present invention matches the root mean square value Vrms of the driving voltage Vd supplied to the driving electrode 111 and the reference voltage Vref applied to the receiving electrodes 121, thereby compensating for a luminance deviation between the driving electrodes 111 and the receiving electrodes 121.

Second, the common electrodes include the driving electrode 111 and the receiving electrode 121.

Third, the driving electrode 111 and the receiving electrode 121 may be formed on the same layer or different layers.

Forth, any voltage level, which can be set in an integrated circuit IC applied to an in-cell type display device, may be used as the reference voltage Vref applied to the receiving electrode 121.

Fifth, the root mean square value of the driving voltage Vd may be adjusted by adjusting an on/off time (i.e., pulse width) of the pulse type driving voltage Vd supplied to the driving electrode 111.

Sixth, any voltage level, which may be set by an integrated circuit (IC) applied to an in-cell type display device, may be used as the minimum level of the driving voltage Vd.

Seventh, any pulse width of the driving voltage Vd may be set in an integrated circuit IC and applied to an in-cell type display device.

According to the present invention, block dim caused by a difference between root mean square values of voltages supplied to a driving electrode 111 and a receiving electrode 121 can be reduced.

Moreover, according to the present invention, in large-size display devices which do not use a negative voltage and in small-size mobile display devices which use a negative voltage, block dim caused by a difference between root mean square values of voltages supplied to a driving electrode 111 and a receiving electrode 121 can be reduced. That is, the present invention may be applied to any kinds of display devices irrespective of the sizes and models of display devices.

Also, according to the present invention, block dim can be reduced by the method of controlling a pulse width of a driving voltage Vd.

Moreover, the present invention matches root mean square values by controlling a duty cycle, and thus may be implemented simpler than a method of controlling a voltage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a panel comprising a plurality of driving electrodes and a plurality of receiving electrodes; and
a touch sensing unit comprising:
   a driver supplying a common voltage to the driving electrodes and the receiving electrodes during an image display period, and sequentially supplying a driving voltage to the driving electrodes to determine whether the panel is touched, during a touch sensing period, and
   a receiver determining whether there is a touch on the panel based on comparison of a sensing signal induced through the receiving electrodes by the driving voltage with a reference voltage applied to the receiving electrodes, the reference voltage being different from an intermediate level of the driving voltage corresponding to an average of a maximum level and a minimum level of the driving voltage,
wherein a root mean square value of the reference voltage is substantially equal to a root mean square value of the driving voltage.

2. The display device of claim 1, wherein the driving voltage comprises a plurality of pulses and a root mean square value of the plurality of pulses is substantially equal to the root mean square value of the driving voltage.

3. The display device of claim 1, wherein the minimum level of the driving voltage has a positive polarity.

4. The display device of claim 1, wherein the reference voltage is less than the intermediate level of the driving voltage.

5. The display device of claim 4, wherein the driving voltage comprises a plurality of pulses including first pulses and second pulses, each of the first pulses having a first pulse width and each of the second pulses having a second pulse width, the first pulses alternating with the second pulses and the first pulse width being narrower than the second pulse width.

6. The display device of claim 5, wherein voltage levels of the first pulses are not less than the reference voltage and voltage levels of the second pulses are not greater than the reference voltage.

7. The display device of claim 1, wherein the reference voltage is greater than the intermediate level of the driving voltage.

8. The display device of claim 7, wherein the driving voltage comprises a plurality of pulses including first pulses and second pulses, each of the first pulses having a first pulse width and each of the second pulses having a second pulse width, the first pulses alternating with the second pulses and the first pulse width being wider than the second pulse width.

9. The display device of claim 8, wherein voltage levels of the first pulses are not less than the reference voltage, and voltage levels of the second pulses are not greater than the reference voltage.

10. A method of driving a display device comprising:
supplying a common voltage to driving electrodes and receiving electrodes, which are formed in a panel, during an image display period;
sequentially supplying a driving voltage to the driving electrodes during a touch sensing period;
comparing a sensing signal induced through the receiving electrodes by the driving voltage with a reference voltage applied to the receiving electrodes, the reference voltage being different from an intermediate level of the driving voltage corresponding to an average of a maximum level and a minimum level of the driving voltage, a root mean square value of the reference voltage being substantially equal to a root mean square value of the driving voltage; and
determining whether there is a touch on the panel based on the comparison of the sensing signal with the reference voltage.

11. The method of claim 10, wherein the driving voltage comprises a plurality of pulses and a root mean square value of the plurality of pulses is substantially equal to the root mean square value of the driving voltage.

12. The method of claim 10, wherein the minimum level of the driving voltage has a positive polarity.

13. The method of claim 10, wherein the reference voltage is less than the intermediate level of the driving voltage.

14. The method of claim 13, wherein the driving voltage comprises a plurality of pulses including first pulses and second pulses, each of the first pulses having a first pulse width and each of the second pulses having a second pulse width, the first pulses alternating with the second pulses and the first pulse width being narrower than the second pulse width.

15. The method of claim 14, wherein voltage levels of the first pulses are not less than the reference voltage and voltage levels of the second pulses are not greater than the reference voltage.

16. The method of claim 10, wherein the reference voltage is greater than the intermediate level of the driving voltage.

17. The method of claim 16, wherein the driving voltage comprises a plurality of pulses including first pulses and second pulses, each of the first pulses having a first pulse width and each of the second pulses having a second pulse width, the first pulses alternating with the second pulses and the first pulse width being wider than the second pulse width.

18. The method of claim 17, wherein voltage levels of the first pulses are not less than the reference voltage and voltage levels of the second pulses are not greater than the reference voltage.

19. A display device comprising:
a panel comprising a plurality of driving electrodes and a plurality of receiving electrodes; and
a touch sensing unit comprising:
a driver supplying a common voltage to the driving electrodes and the receiving electrodes during an image display period, and sequentially supplying a driving voltage to the driving electrodes to determine whether the panel is touched, during a touch sensing period, the driving voltage comprising a plurality of pulses including first pulses and second pulses, each of the first pulses having a first pulse width and each of the second pulses having a second pulse width, the first pulses alternating with the second pulses and the first pulse width being different from the second pulse width, and
a receiver determining whether there is a touch on the panel based on comparison of a sensing signal induced through the receiving electrodes by the driving voltage with a reference voltage applied to the receiving electrodes, the reference voltage being different from an intermediate level of the driving voltage corresponding to an average of a maximum level and a minimum level of the driving voltage.

20. The display device of claim 19, wherein the reference voltage is less than the intermediate level of the driving voltage, and the first pulse width is narrower than the second pulse width.

* * * * *